United States Patent
Glück

(10) Patent No.: US 12,542,441 B2
(45) Date of Patent: Feb. 3, 2026

(54) METHOD FOR OPERATING A VEHICLE

(71) Applicant: AUDI AG, Ingolstadt (DE)

(72) Inventor: Christian Glück, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 157 days.

(21) Appl. No.: 17/420,489

(22) PCT Filed: Dec. 11, 2019

(86) PCT No.: PCT/EP2019/084601
§ 371 (c)(1),
(2) Date: Jul. 2, 2021

(87) PCT Pub. No.: WO2020/156715
PCT Pub. Date: Aug. 6, 2020

(65) Prior Publication Data
US 2022/0085644 A1    Mar. 17, 2022

(30) Foreign Application Priority Data

Jan. 31, 2019  (DE) .................. 10 2019 201 247.7

(51) Int. Cl.
*B60K 6/28* (2007.10)
*B60L 1/02* (2006.01)
(Continued)

(52) U.S. Cl.
CPC ............... *H02J 7/342* (2020.01); *B60L 1/02* (2013.01); *B60R 16/033* (2013.01);
(Continued)

(58) Field of Classification Search
CPC ......... B60K 6/28; B60L 1/02; B60L 2210/10; B60L 2240/36; B60L 2240/80;
(Continued)

(56) References Cited

U.S. PATENT DOCUMENTS

| 5,488,283 A | 1/1996 | Dougherty et al. |
| 2004/0025839 A1* | 2/2004 | Kashibata ............. F02P 1/08 |
| | | 123/406.47 |

(Continued)

FOREIGN PATENT DOCUMENTS

| CN | 107963040 A | 4/2018 |
| CN | 207481809 U | 6/2018 |

(Continued)

OTHER PUBLICATIONS

German Examination Report issued on Nov. 6, 2019 in corresponding German Application No. 10 2019 201 247.7; 20 pages; Machine translation attached.

(Continued)

*Primary Examiner* — Long T Tran
(74) *Attorney, Agent, or Firm* — Maier & Maier, PLLC

(57) ABSTRACT

A method for operating a vehicle having: an internal combustion engine for driving the vehicle; at least one emission-relevant load; at least one electrical-system battery; and at least one vehicle battery, in which method prior to the start-up of the vehicle, the at least one vehicle battery is charged with electrical energy from the at least one electrical-system battery and, prior to and/or during the start-up of the internal combustion engine, the at least one emission-relevant load is charged with this electrical energy from the vehicle battery.

19 Claims, 1 Drawing Sheet

(51) Int. Cl.
*B60R 16/033* (2006.01)
*B60W 20/13* (2016.01)
*F01N 3/20* (2006.01)
*F02N 11/08* (2006.01)
*H02J 7/00* (2006.01)
*H02J 7/34* (2006.01)

(52) U.S. Cl.
CPC ........ *F01N 3/2013* (2013.01); *F02N 11/0862* (2013.01); *H02J 7/0063* (2013.01); *H02J 7/00712* (2020.01); *B60K 6/28* (2013.01); *B60W 20/13* (2016.01); *B60Y 2200/92* (2013.01)

(58) Field of Classification Search
CPC ...... B60L 2270/12; B60L 50/15; B60L 58/20; B60R 16/033; B60W 10/26; B60W 10/30; B60W 20/13; B60W 20/16; B60W 2510/244; B60W 2555/20; B60W 2710/248; B60W 30/18054; B60W 30/194; B60W 50/0097; B60Y 2200/92; F01N 3/2013; F02N 11/0862; H02J 7/0063; H02J 7/00712; H02J 7/342; Y02T 10/70; Y02T 10/7072; Y02T 10/72
See application file for complete search history.

(56) References Cited

U.S. PATENT DOCUMENTS

| | | | |
|---|---|---|---|
| 2009/0081490 A1* | 3/2009 | Alp ................... | H01M 8/04302 429/435 |
| 2009/0081502 A1* | 3/2009 | Alp ................... | H01M 8/04746 429/432 |
| 2010/0107608 A1* | 5/2010 | Mitsutani ................ | B60L 50/16 60/299 |
| 2012/0072063 A1* | 3/2012 | Kato ..................... | B60W 10/26 180/65.265 |
| 2013/0291526 A1 | 11/2013 | Gonze et al. | |
| 2014/0210262 A1* | 7/2014 | Yaegaki ................ | B60W 20/50 180/65.265 |
| 2018/0316205 A1* | 11/2018 | Lin ........................ | F02N 11/087 |
| 2018/0334170 A1* | 11/2018 | Liu ........................ | B60W 10/30 |

FOREIGN PATENT DOCUMENTS

| | | |
|---|---|---|
| CN | 108590818 A | 9/2018 |
| DE | 102014201358 A1 | 7/2015 |
| DE | 102014218775 A1 | 3/2016 |
| DE | 102016006526 A1 | 11/2017 |
| DE | 102016110525 A1 | 12/2017 |
| DE | 102016217955 A1 | 3/2018 |
| DE | 102018111259 A1 | 11/2018 |
| EP | 1 630 927 A2 | 3/2006 |
| GB | 2541426 * | 2/2017 |
| JP | H 11164494 * | 6/1999 |
| JP | 2017124684 * | 7/2017 |

OTHER PUBLICATIONS

German Examination Report issued on Feb. 19, 2020 in corresponding German Application No. 10 2019 201 247.7; 8 pages; Machine translation attached.
German Examination Report issued on Jun. 5, 2020 in corresponding German Application No. 10 2019 201 247.7; 8 pages; Machine translation attached.
International Search Report (with English translation) and Written Opinion (with Machine translation) issued on Apr. 20, 2020 in corresponding International Application No. PCT/EP2019/084601; 19 pages.
International Preliminary Report on Patentability issued on Nov. 23, 2020 in corresponding International Application No. PCT/EP2019/084601; 32 pages.
European Patent Office Examination Report, issued on Jul. 25, 2022, in corresponding European Application No. 19 829 009.0-1012; 8 pages; Machine Translation Attached.
Office Action issued on Jul. 3, 2023, in corresponding Chinese Application No. 201980090855.9, 14 pages.
Examination Report issued on May 7, 2024, in corresponding European Application No. 19829009.0, 8 pages.

* cited by examiner

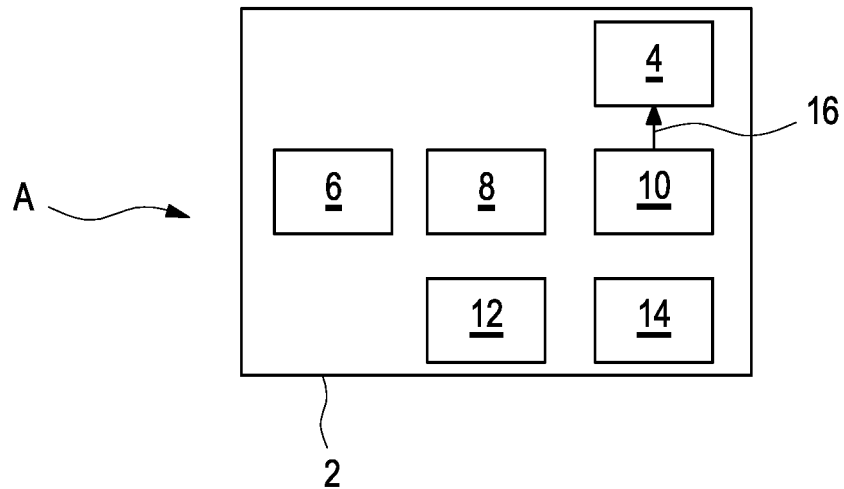
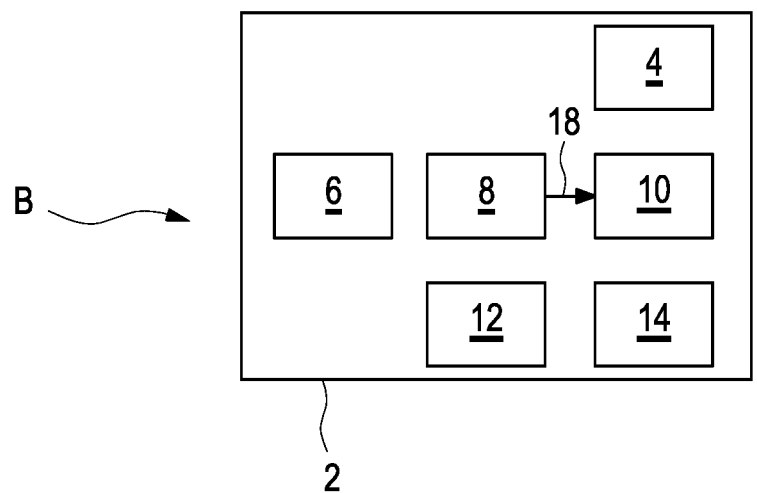
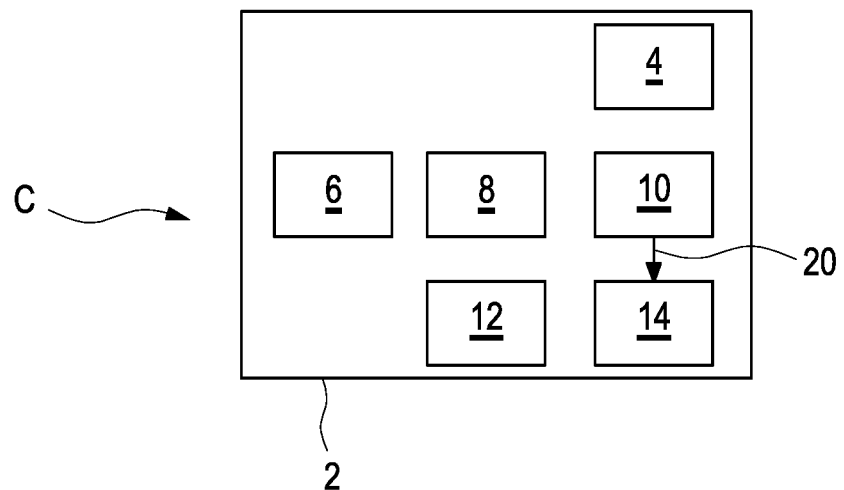

METHOD FOR OPERATING A VEHICLE

FIELD

The invention relates to a method for operating a vehicle and a system for operating a vehicle.

BACKGROUND

A vehicle designed as a hybrid vehicle can optionally be driven by an internal combustion engine or an electric motor. In this case, an exhaust gas purification device is connected downstream of the internal combustion engine, which is to be set for an upcoming journey when the hybrid vehicle is started.

DE 10 2016 110 525 A1 describes a method for operating an electrical system of a hybrid vehicle, an electrical system for a hybrid vehicle and a hybrid vehicle.

An on-board electrical system and a method for operating an on-board electrical system are described in DE 10 2014 201 358 A1.

A multi-voltage storage system is known from the printed publication DE 10 2014 218 775 A1.

A battery system for a vehicle, known from U.S. Pat. No. 5,488,283 A, includes a main battery for energizing SLI circuits and an auxiliary battery for energizing an EHC system of the vehicle, wherein the battery system provides, under certain conditions, the ability to charge the auxiliary battery once the vehicle engine is running, wherein the auxiliary battery shares the charging current with the main battery.

A method for controlling an electrical system of an electrically drivable motor vehicle is known from the publication DE 10 2016 006 526 A1. A first DC voltage is provided by means of a first energy storage device of a first vehicle electrical system and a second DC voltage is provided by means of a second energy storage device of a second vehicle electrical system.

US 2013/291526 A1 describes an exhaust gas treatment system for an internal combustion engine, wherein the internal combustion engine has an engine-off state. In this regard, an exhaust line is in fluid communication with the internal combustion engine configured to receive an exhaust gas from the internal combustion engine.

A method for operating a hybrid vehicle is known from DE 10 2016 217 955 A1. The hybrid vehicle is operated with an internal combustion engine, an electric machine and a transmission.

A power supply system known from EP 1 630 927 A2, which is installed in a vehicle having an engine and an electric load, has a first storage battery, an alternator driven by the engine of the vehicle for generating electric power and charging the first storage battery with the electric power generated when the engine is running, and a second storage battery connected to the electric load and the first storage battery.

With this in mind, it has been an object to prepare a vehicle for a journey.

SUMMARY

This task is solved by a method and a system having the features of the independent patent claims. Embodiments of the method and the system are apparent from the dependent patent claims.

Method for operating a vehicle having an internal combustion engine for driving or moving the vehicle, at least one emission-relevant load, at least one vehicle electrical-system battery, for example a starter battery, and at least one vehicle battery. In the method, prior to the start-up of the vehicle the at least one vehicle battery is charged with electrical energy from the at least one electrical-system battery, wherein when starting e.g. for starting the vehicle and still before and/or during starting of the internal combustion engine the at least one emission-relevant load is charged with this electrical energy from the at least one vehicle battery.

This at least one emission-relevant load can be started up, e.g. started, with this electrical energy.

In an embodiment, the at least one emission-relevant load is heated with electrical energy from the at least one vehicle battery until an operating temperature intended for this purpose is or has been reached. The at least one load is supplied with electrical energy from the at least one vehicle battery at the starting or start or starting up of the vehicle even before the start-up of the internal combustion engine, which has already been charged from the at least one vehicle electrical-system battery into the at least one vehicle battery before the start-up or starting of the vehicle, usually at the end of an nth journey carried out immediately beforehand. This is possible, for example, if the at least one emission-relevant load has a temperature that is lower than the operating temperature intended for it.

Furthermore, the electrical energy is charged from the at least one vehicle electrical-system battery into the at least one vehicle battery after the vehicle and/or the internal combustion engine has been switched off after the previous nth journey for a future n+1th journey and/or a future start of the vehicle.

It is also possible that, in the method, electrical energy is already charged from the electrical-system battery into the at least one vehicle battery before a start-up of the vehicle designed as an initial start, wherein this electrical energy is charged from the at least one vehicle battery into the at least one emission-relevant load during the initial start of the vehicle and even before a start-up of the internal combustion engine designed as an initial start. In this context, a respective initial start is performed after a stationary period of the vehicle after the previous nth journey and before the future n+1th journey.

The at least one electrical-system battery has an electrical voltage of 12 V and the at least one vehicle battery has an electrical voltage of 48 V. As a rule, the at least one vehicle battery has a higher voltage, e.g. four times higher voltage, than the at least one vehicle electrical-system battery.

In an embodiment, the quantity of electrical energy required to start up the at least one emission-relevant load for the nth journey is determined during the nth journey of the vehicle, and is charged from the at least one vehicle battery into the at least one emission-relevant load for the nth journey or, as the case may be, the nth journey of the vehicle. last journey, wherein when the internal combustion engine and/or the vehicle is switched off after this nth journey, at least this quantity of electrical energy is charged from the at least one vehicle electrical-system battery into the at least one vehicle battery in preparation for the next immediately following n+1th journey. Thus, the amount of energy required during the previous nth journey is determined.

The method is carried out for at least one emission-relevant load, i.e. for starting up at least one emission-relevant load, which is designed as an exhaust gas purification device or exhaust gas system, for example for exhaust gas aftertreatment for exhaust gas from the internal combustion engine, and/or as an air conditioning module.

In addition to the internal combustion engine, the vehicle, e.g. a motor vehicle or car, has at least one electric motor for driving or moving the vehicle, with electrical energy being supplied to this electric motor from the vehicle electrical-system battery while the vehicle is moving. Such a vehicle is designed as a hybrid vehicle.

In one embodiment of the method, the electrical energy for the start-up of the at least one emission-relevant load, i.e. before starting or the start, in particular initial starting, e.g. directly before the start-up of the at least one emission-relevant load, e.g. during a first defined or definable time period before the start-up, is supplied to the electric machine, during starting of the at least one emission-relevant load and/or also after starting or the start-up, in particular initial starting of the at least one emission-relevant load, for example during a second defined or definable period of time, after starting, is charged into the at least one emission-relevant load. A respective time period lasts, for example, several seconds, for example 60 seconds.

Furthermore, the electrical energy for the start-up of the at least one emission-relevant load, i.e. before starting or the start, in particular initial starting, e.g. directly before starting the internal combustion engine, e.g. during a first defined or defined period of time before starting, but additionally also during starting of the internal combustion engine and/or also after starting or the start, in particular initial starting, of the internal combustion engine, for example during a second defined or definable period of time after starting, is charged into the at least one emission-related load.

The system according to the invention is designed for operating a vehicle, wherein the vehicle has an internal combustion engine for driving or moving the vehicle, at least one emission-relevant load, at least one vehicle electrical-system battery, for example a starter battery, and at least one vehicle battery. The system has at least one control unit which is designed to cause electrical energy to be charged from the vehicle electrical-system battery to the at least one vehicle battery before starting or the start, for example initial starting, of the vehicle, and to cause this electrical energy to be charged from the at least one vehicle battery to the at least one emission-relevant load, for example when starting the vehicle and already before starting or the start, for example initial starting, of the internal combustion engine.

The method makes it possible, for example, to implement energy management for an electric catalytic converter as an exhaust gas purification device and/or a high-performance secondary air system as an air conditioning module, which is/are operated with an electrical voltage of 48 V, without the electrical energy required for this, i.e. electrical energy for starting the electric catalytic converter as an exhaust gas purification device and/or the high-performance secondary air system as an air conditioning module, having to be statically precharged in the 48 V battery or vehicle battery, since the required energy is dynamically stored in the vehicle electrical-system battery and has already been initially charged from the at least one vehicle electrical-system battery into the at least one vehicle battery when the vehicle is switched off after the journey or after a previous driving cycle and thus before the internal combustion engine is started for the future journey or for a future driving cycle in order to start up the at least one exhaust-gas-relevant load for this future journey. Thus, it is possible to comply with an exhaust emission standard, e.g. EU7.

In an embodiment, the energy or quantity of energy for starting up the exhaust gas purification device and/or the air conditioning module is provided only and/or exclusively directly as a consequence of starting the vehicle and before the internal combustion engine is started. Thereby, in an embodiment of the method, it is sufficient that this energy is available to the at least one vehicle battery prior to the start of the internal combustion engine and is provided to the at least one emission-relevant load from the at least one vehicle battery for start-up prior to the start of the internal combustion engine. During an active drive or during an active drive cycle in ongoing operation of the vehicle, this energy is not required because the at least one emission-relevant load has already started up and is at its intended operating temperature, for example.

After the at least one emission-relevant load has started up, the necessary energy is stored or saved in the at least one vehicle electrical-system battery and is stored or saved in the at least one vehicle electrical-system battery until the end of the journey or the driving cycle. After the vehicle has been driven or after the driving cycle, the electrical energy is transferred from the at least one vehicle electrical-system battery to the at least one vehicle battery when the vehicle and/or the internal combustion engine is switched off, wherein the electrical energy is transferred from a 12 V side of an electrical system of the vehicle, which has the at least one vehicle electrical-system battery, to a 48 V side of the electrical system of the vehicle, which has the at least one vehicle battery, and being stored therein until a renewed or future or subsequent start of the vehicle and the start-up of the at least one emission-relevant load to be carried out in the process. A respective start-up of the at least one emission-relevant load is already prepared at the end of the previously executed journey.

There are no restrictions with regard to functional safety, since no journey is performed or no drive cycle is active when the vehicle is parked and thus no risk can arise due to a lack of redundancy.

The vehicle battery can be fully utilized during the journey, no further reserves of electrical energy need to be formed there or therein, but the power requirement of the at least one emission-relevant load can still be covered from the vehicle battery or 48 V battery at the start of the journey to be carried out.

With the method, a significant cost saving and a CO2 saving, e.g. a significant potential regarding the CO2 saving, can be achieved. It is taken into account that a storage size and/or storage capacity of the vehicle battery based on 48 V is limited to a maximum value of up to 1000 Wh.

In the method, a transfer of the necessary energy for the at least one emission-relevant load is performed from the electrical-system battery to the vehicle battery with the voltage of 48 V after the end of the previously performed journey. Thereby, an operation of the at least one emission-relevant load or a corresponding high-power load is enabled without restriction of a CO2 potential to or at the restart of the internal combustion engine or a corresponding engine start.

The vehicle comprises the internal combustion engine and at least one electric machine for propulsion and/or locomotion. This at least one electric machine with a voltage of 48 V can be arranged at different positions of a drive train of the vehicle, depending on the embodiment of the vehicle. For example, a position P0, P1, P2, P3 or P4 is provided as an output topology. The vehicle may be and/or be designated as a mild hybrid. The vehicle can have an electric machine, for example, designed and/or to be designated as a belt starter generator (BSG) with a voltage of 48 V, the at least one vehicle battery with a voltage of 48 V, a bidirectional DCDC converter designed to convert a voltage from 12 V to 48 V and vice versa, the at least one electrical-system battery with a voltage of 12 V, and, if necessary at least one further electric machine or electric motor for traction at a position P0, P1, P2, P3 and/or P4. In order to achieve emission limits in accordance with EU7, high electrical power is required immediately after the start of the internal combustion engine, which is used to supply the at least one emission-relevant load of the vehicle, which has a voltage of 48 V. The at least one emission-relevant load with the voltage of 48 V is designed, for example, as an electric catalytic converter as an embodiment of an exhaust gas purification system and/or, for example, as a high-performance secondary air system as an embodiment of an air conditioning module. Here, it is taken into account that due to a power of the at least one emission-relevant load, a start-up of this at least one emission-relevant load with a voltage of 12 V is no longer possible.

In the embodiment of the method, the power required for the at least one emission-relevant load immediately after the start of the internal combustion engine is provided by the at least one vehicle battery, since this energy cannot be supplied serially by a generator. Up to now, a maximum regenerative power take-off from the internal combustion engine has only been possible in the range of 4 kW to 8 kW due to, among other things, acoustics and emissions. In the process, on the other hand, electrical power of up to 15 kW can be provided.

Thus, the energy for supplying the at least one emission-relevant load is already held in reserve by the at least one electrical-system battery during the previously performed journey and is only made available to the at least one vehicle battery for the next journey at the end of the previously performed journey. During the journey, the at least one vehicle battery can provide appropriately sufficient energy for a respectively intended driving strategy, while still achieving a required CO2 savings potential.

Thus, it is also not necessary to perform a step-up operation during active driving via the DCDC converter, since this is to be avoided from the point of view of a functional safety. By dispensing with the step-up operation, the 12 V side of the vehicle electrical system to which control units, e.g. for steering and braking, are connected can also be supplied redundantly, so that a hazard is avoided even in the event of a fault in the vehicle electrical-system battery.

It is therefore not necessary that an energy reserve must always be maintained in the at least one vehicle battery as a storage on 48 V, in which energy of, for example, 800 Wh to 1000 Wh can be stored. Nevertheless, when the method is carried out, the at least one emission-relevant load can be operated and/or served on 48 V at the start of the next journey. In addition, the full energy is now available for CO2 reduction by the at least one emission-relevant load.

In the process, the electrical energy for the at least one emission-relevant load is increased. The required energy is provided, for example, from the vehicle battery after the vehicle and/or the internal combustion engine has been switched off.

In the method, a defined quantity of electrical energy is already charged from the at least one vehicle electrical-system battery into the at least one vehicle battery directly as a consequence of the vehicle being switched off, before the actual journey or an active driving cycle is performed in an implementation of the method. Consequently, it is not necessary to regularly check how much electrical energy is in the electrical storage units or batteries, i.e., in the at least one electrical-system battery and the at least one vehicle battery, since in the case of such permanent checking or monitoring at least one battery would otherwise be emptied by at least one bus load that is applied and required for this purpose.

Usually, a vehicle battery is designed as a lithium-ion battery, whereas an electrical-system battery can be designed as a lead-acid battery.

A capacity of a vehicle battery is, for example, 800 Wh. To start up the at least one emission-relevant load, an electrical power of 15 KW is required, for example, which is why 200 Wh would have to be kept available in the vehicle battery at all times. However, it would be inefficient to keep a quarter or a third of these 800 Wh of energy unused while driving. According to the invention, the necessary energy is now held in the electrical-system battery and only transferred to the vehicle battery shortly before a transfer or a transmission to the emission-relevant load and ultimately charged from there to the emission-relevant load. Furthermore, it is possible that the electrical energy is charged from the at least one vehicle battery into the at least one emission-relevant load, for example, during a start of the internal combustion engine designed as a key start. The control unit or a control unit of the system for performing energy management can calculate how much energy is required for the next start, e.g. initial start, on the basis of an ambient condition, e.g. an outside temperature. Further, in an embodiment, the method is performed when the exhaust gas purification device or an exhaust gas system is not yet at its intended operating temperature when the internal combustion engine is cold.

It is understood that the above-mentioned features and those to be explained below can be used not only in the respective combination indicated, but also in other combinations or on their own, without leaving the scope of the present invention.

BRIEF DESCRIPTION OF THE FIGURE(S)

The invention is illustrated schematically by means of embodiments in the drawing and is described schematically and in detail with reference to the drawing.

FIG. 1 shows in schematic representation an example of a vehicle for which an embodiment of the method according to the invention is carried out.

DETAILED DESCRIPTION

FIG. 1 shows in schematic representation an example of a vehicle 2, in the embodiment of the method according to the invention in different operating conditions A, B and C. This vehicle 2 comprises as components an electric machine 4, a control unit 6, an electrical-system battery 8 as a first battery with a voltage of 12 volts, a vehicle battery 10 as a second battery with a voltage of 48 volts, an internal combustion engine 12 and an exhaust gas purification device 14 as an example of an emission-relevant load of the vehicle 2.

It is further provided that the electric machine 4 and the internal combustion engine 12 are both provided as drive units of the vehicle 2, wherein it is possible to drive or move the vehicle 2 either with the electric machine 4 or with the internal combustion engine 12. Therefore, the vehicle 2 shown here is also designed and/or to be designated as a hybrid vehicle.

In the first operating condition A provided here, it is a matter of an nth journey of the vehicle 2, where n is an integer, wherein it is provided here that functions of the vehicle 2 during the journey are also controlled by the control unit 6 independently of the embodiment of the method presented here.

During the nth travel of the vehicle 2, which is configured here as a hybrid vehicle, in the first operating condition A, it is possible, on the one hand, for the vehicle 2 to be driven by the internal combustion engine 12. In this case, a fuel, for example a hydrocarbon compound, is burned within the combustion engine 12. In the process, the combustion engine 12 converts chemical energy from the fuel into mechanical energy and transfers it to wheels of the vehicle 2. When the hydrocarbon compound is burned, exhaust gases are produced, but these are purified by the exhaust gas device 14.

On the other hand, the vehicle 2 can alternatively be driven by the electric machine 4, in which case electrical energy stored in the vehicle battery 10 is provided to the electric machine 4 for this purpose (arrow 16). This electrical energy is converted by the electric machine 4, if it is operated as an electric motor, into mechanical energy and transferred to wheels of the vehicle 2.

If the vehicle 2 is driven by the internal combustion engine 12 during travel, however, it is necessary that the exhaust gas device 14 has at least one operating temperature intended for this purpose in order to clean the exhaust gases.

For this purpose, in the presented embodiment of the method, it is provided that the exhaust device 14 is set and/or prepared for a future subsequent n+1th journey. Such preparation and or adjustment is carried out here after the nth journey, when the electric machine 4, the internal combustion engine 14 and the vehicle 2 are switched off. Thereby, in the context of the method, a further operating condition B is provided after the vehicle 2 has been parked. In this case, electrical energy is transferred from the electrical-system battery 8 to the vehicle battery 10, and this electrical energy remains stored in the vehicle battery 10 during a standstill of the vehicle in the vehicle battery 10.

In the embodiment of the method, in a third operating condition C, it is provided that the vehicle 2 is restarted after the standstill that follows the parking of the vehicle 2 in the operating condition B. In this case, the electrical energy that has previously been transferred from the electrical-system battery 8 to the vehicle battery 10 continues to be transferred from the vehicle battery 10 to the exhaust gas purification device 14 when the vehicle 2 is started and before a start, for example an initial start, of the internal combustion engine 12 (arrow 20). The exhaust gas purification device 14 is warmed up or heated with this electrical energy, whereby the exhaust gas purification device 14 is ramped up and reaches at least the operating temperature intended for the exhaust gas purification device 14 even before a start of the internal combustion engine 12. Thus, the vehicle 2 and the exhaust gas purification device 14 are prepared for the subsequent further n+1th journey (renewed operating condition A), which follows the start of the vehicle 2, the ramping up of the exhaust gas purification device 20 and the start of the internal combustion engine 10 (operating condition A). Here, it is provided that the control unit 6 or a corresponding control unit as part of an embodiment of a system according to the invention is designed to control the method.

REFERENCE NUMBERS

A,B,C Operating condition
2 Vehicle
4 Electric machine
6 Control unit
8 Electrical-system battery
10 Vehicle battery
12 Combustion engine
14 Exhaust gas purification device
16, 18, 20 Arrow

The invention claimed is:

1. A method for operating a vehicle comprising an internal combustion engine for driving the vehicle, at least one emission-relevant load, at least one electrical-system battery, and at least one vehicle battery, the method comprising:
   determining a quantity of electrical energy which was required to start the at least one emission-relevant load during a current or previous n-th journey,
   after determining that the at least one emission-relevant load is to receive a transfer, and prior to the emission-relevant load being supplied with the quantity of electrical energy, transferring the quantity of electrical energy from the at least one electrical-system battery to the at least one vehicle battery prior to an initial start of the vehicle for an upcoming n+1-th journey, and
   energizing the at least one emission-relevant load using the vehicle battery prior to startup of the internal combustion engine for the upcoming n+1-th journey,
   wherein the at least one vehicle battery has an electrical voltage which is higher than that of the at least one electrical-system battery.

2. The method according to claim 1, wherein energizing the at least one emission-relevant load occurs at startup of the internal combustion engine for the upcoming n+1-th journey.

3. The method according to claim 1, wherein energizing the at least one emission-relevant load comprises electrical heating.

4. The method according to claim 1, wherein transferring the quantity of electrical energy occurs once the vehicle has been parked after the current or previous n-th journey.

5. The method according to claim 1, wherein the at least one electrical-system battery has an electrical voltage of 12 V and the at least one vehicle battery has an electrical voltage of 48 V.

6. The method according to claim 1, wherein the at least one emission-relevant load serves as an exhaust gas purification device.

7. The method according to claim 1, wherein energizing the at least one emission-relevant load constitutes startup of the at least one emission-relevant load.

8. The method according to claim 1, wherein the at least one emission-relevant load operates at the electrical voltage of the at least one vehicle battery.

9. The method according to claim 1, wherein the at least one electrical-system battery is a starter battery.

10. The method according to claim 1, wherein the at least one electrical-system battery is a lead-acid battery.

11. The method according to claim 10, wherein the at least one vehicle battery is a lithium-ion battery.

12. The method according to claim 1, wherein the vehicle battery further supplies energy to the at least one emission-relevant load during active driving of the vehicle.

13. The method according to claim 12, wherein, in an instance where the vehicle battery further supplies energy to the at least one emission-relevant load during the active driving of the vehicle, no step-up operation is performed during the active driving.

14. The method according to claim 1, wherein determining the quantity of electrical energy is performed during a current n-th journey or after concluding a previous n-th journey, and wherein transferring the quantity of electrical energy from the at least one electrical-system battery to the at least one vehicle battery is performed after concluding the current or previous n-th journey by parking and switching off the vehicle and prior to subsequently switching on the vehicle.

15. The method according to claim 14, further comprising a step of:
    determining that the vehicle has been parked and switched off, wherein determining that the at least one emission-relevant load is to receive the transfer is based on determining that the vehicle has been parked and switched off.

16. The method according to claim 1, wherein at least the at least one electrical-system battery has a control unit electrically connected thereto and supplied thereby; and
    wherein determining the quantity of electrical energy required to start the at least one emission-relevant load is performed by determining, with the control unit, the quantity of electrical energy supplied by the at least one vehicle battery to the at least one emission-relevant load.

17. The method according to claim 16, further comprising determining whether to change the quantity of electrical energy based on at least one sensed ambient condition;
    wherein energization of the at least one emission-relevant load uses either the quantity of electrical energy or an adjustment to the quantity of electrical energy based on the at least one sensed ambient condition.

18. A system for operating a vehicle, the vehicle comprising an internal combustion engine for driving, at least one emission-relevant load, at least one electrical-system battery, and at least one vehicle battery, the system comprising at least one control unit which is configured to:
    determine a quantity of electrical energy which was required to start the at least one emission-relevant load during a current or previous n-th journey,
    after determining that the at least one emission-relevant load is to receive a transfer, and prior to the emission-relevant load being supplied with the quantity of electrical energy, command transfer of the quantity of electrical energy from the at least one electrical-system battery to the at least one vehicle battery prior to an initial start of the vehicle for an upcoming n+1-th journey, and
    command energization the at least one emission-relevant load using the vehicle battery prior to startup of the internal combustion engine for the upcoming n+1-th journey,
    wherein the at least one vehicle battery has an electrical voltage which is higher than that of the at least one electrical-system battery.

19. The system according to claim 18, wherein the at least one emission-relevant load operates at the electrical voltage of the at least one vehicle battery.

\* \* \* \* \*